(12) United States Patent
Gila et al.

(10) Patent No.: US 10,162,243 B2
(45) Date of Patent: Dec. 25, 2018

(54) E-PAPER DISPLAY MEDIA

(71) Applicant: Hewlett-Packard Development Company, L.P., Fort Collins, CO (US)

(72) Inventors: Omer Gila, Palo Alto, CA (US); Henryk Birecki, Palo Alto, CA (US); Napoleon J Leoni, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/114,409

(22) PCT Filed: Jan. 31, 2014

(86) PCT No.: PCT/US2014/014312
§ 371 (c)(1),
(2) Date: Jul. 27, 2016

(87) PCT Pub. No.: WO2015/116214
PCT Pub. Date: Aug. 6, 2015

(65) Prior Publication Data
US 2016/0342064 A1    Nov. 24, 2016

(51) Int. Cl.
*G02B 26/00* (2006.01)
*G02F 1/167* (2006.01)
(Continued)

(52) U.S. Cl.
CPC ............ *G02F 1/167* (2013.01); *B41J 3/4076* (2013.01); *G06F 1/1652* (2013.01); *G09G 3/344* (2013.01);
(Continued)

(58) Field of Classification Search
CPC ................ H01L 27/1225; H01L 29/45; H01L 29/78606; H01L 29/7869; H01L 21/76; H01L 27/1262; H01L 27/127; H01L 27/1288; H01L 29/6675; H01L 31/022466; H01L 21/4867; H01L 27/3288; H01L 31/022483; H01L 31/1884; H01L 31/1888;
(Continued)

(56) References Cited

U.S. PATENT DOCUMENTS 5,866,284 A    2/1999    Vincent
6,333,754 B1   12/2001   Oba et al.
(Continued)

FOREIGN PATENT DOCUMENTS

JP    01136130        5/1989
JP    2007-033877 A   2/2007
(Continued)

OTHER PUBLICATIONS

International Search Report and Written Opinion of the International Searching Authority, dated Oct. 29, 2015; issued in related PCT Application No. PCT/US2014/014312.
(Continued)

*Primary Examiner* — Brandi Thomas
(74) *Attorney, Agent, or Firm* — Dicke Billig & Czaja PLLC (57) ABSTRACT

A media includes at least one passive e-paper display. The display has a first side and an opposite, second side, with the display defining an image-bearing surface that is generally co-extensive with substantially the entire first side.

20 Claims, 6 Drawing Sheets

(51) Int. Cl.
*B41J 3/407* (2006.01)
*G06F 1/16* (2006.01)
*G09G 3/34* (2006.01)

(52) U.S. Cl.
CPC ..... *G09G 2300/04* (2013.01); *G09G 2380/02* (2013.01); *G09G 2380/14* (2013.01)

(58) Field of Classification Search
CPC ................ H01L 51/0021; G02F 1/167; G02F 2001/1676; G02F 1/1333; G02F 1/134336; G02F 1/13439; G02F 2001/133302; G02F 2001/1672; G02F 2001/1678; G02F 2202/046; G02F 1/133305; G02F 1/136204; G02F 1/136213; G02F 1/136227; G02F 1/1523; G02F 1/157; G02F 1/163
USPC ................ 359/237, 242, 265–267, 270–273, 359/290–292, 295, 296, 298, 315, 321, 359/322
See application file for complete search history.

(56) References Cited

U.S. PATENT DOCUMENTS

| | | |
|---|---|---|
| 6,515,790 B2 | 2/2003 | Miyamoto et al. |
| 6,700,695 B2 | 3/2004 | Engler et al. |
| 6,982,734 B2 | 1/2006 | Pan et al. |
| 7,140,550 B2 | 11/2006 | Ramachandran |
| 7,580,845 B2 | 8/2009 | Burman |
| 7,789,489 B2 | 9/2010 | Matsuzoe |
| 7,855,711 B2 | 12/2010 | Schmitz |
| 8,018,410 B2 | 9/2011 | Schmitz et al. |
| 8,144,388 B2 | 3/2012 | Ogawa |
| 8,279,167 B2 | 10/2012 | Cato |
| 8,514,256 B2 | 8/2013 | Ogawa et al. |
| 8,545,302 B2 | 10/2013 | Wu |
| 2001/0055000 A1 | 12/2001 | Kanae et al. |
| 2002/0135859 A1 | 9/2002 | Haga |
| 2003/0067427 A1 | 4/2003 | Comiskey et al. |
| 2005/0134550 A1 | 6/2005 | Schmitz |
| 2006/0017659 A1 | 1/2006 | Ogawa et al. |
| 2007/0045399 A1 | 3/2007 | Martin |
| 2008/0297489 A1 | 12/2008 | Funo et al. |
| 2008/0297878 A1 | 12/2008 | Brown |
| 2008/0303782 A1 | 12/2008 | Grant et al. |
| 2011/0181532 A1 | 7/2011 | Pan |
| 2011/0298760 A1 | 12/2011 | Gila et al. |
| 2012/0105370 A1* | 5/2012 | Moore ............. G06F 3/0412 345/174 |
| 2012/0206341 A1 | 8/2012 | Gila et al. |
| 2012/0274616 A1 | 11/2012 | Scribner |
| 2012/0320001 A1 | 12/2012 | Gila |
| 2013/0003162 A1* | 1/2013 | Leoni ............. G02F 1/167 359/296 |
| 2013/0235446 A1 | 9/2013 | Leoni et al. |
| 2013/0271445 A1* | 10/2013 | Park ............. G09G 5/003 345/212 |
| 2013/0271820 A1 | 10/2013 | Nakahara |
| 2014/0210805 A1 | 7/2014 | Birecki et al. |
| 2014/0239068 A1 | 8/2014 | Park |
| 2014/0253426 A1 | 9/2014 | Leoni et al. |

FOREIGN PATENT DOCUMENTS

| | | |
|---|---|---|
| KR | 20080085263 | 9/2008 |
| WO | WO-2013175212 | 11/2013 |

OTHER PUBLICATIONS

Yang, High reflectivity electrofluidic pixels with zero-power grayscale operation, Applied Physics Letters 97,143501, 2010, 3 pages.
Technology Advances in Flexible Displays and Substrates Janglin Chen and C. T. Liu Industrial Technology Research Institute. Hsinchu 310-40, Taiwan Corresponding author: J.

* cited by examiner

E-PAPER DISPLAY MEDIA

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

In at least some examples of the present disclosure, a media includes at least one passive e-paper display. The display has a first side and an opposite, second side, with the display defining an image-bearing surface that is generally co-extensive with substantially the entire first side. In some examples, this arrangement is referred to as a borderless display media in that no frame overlies or extends laterally outward from the outer edge of the e-paper display. In one aspect, this borderless arrangement gives the e-paper display an appearance closer to real paper. In sharp contrast, traditional e-paper configurations, such as the active e-paper format of an e-reader like the Kindle® from Amazon, includes a bulky frame surrounding its e-paper display.

Moreover, in at least some examples of the present disclosure, a passive e-paper display media is relatively thin and light because it omits a power supply and omits internal circuitry, thereby giving the passive e-paper display media a look and feel more like traditional paper. Instead, the passive e-paper display media in at least some examples of the present disclosure relies on a charge-responsive layer that is imageable via an external writing module and that does not require a power supply to be imaged or to retain an image.

In sharp contrast, traditional e-paper implementations include active e-paper structures having internal circuitry and/or an on-board power supply, making them relatively heavy and not feeling like traditional paper.

In at least some examples of the present disclosure, a passive e-paper display media includes an imageable/viewable surface on two opposite sides of the same display media. In other words, the display media is provided in a duplex format such that both sides of a single sheet format of a display media are embodied as passive e-paper structures. This arrangement further provides a look and feel of traditional paper in that both sides of the e-paper display media are imageable/viewable surface. Moreover, in at least some examples, the e-paper display media is made from flexible layers, further enabling the display media to be handled and/or printed in a manner looking and feeling more like traditional paper.

While traditional paper is not necessarily better than an e-paper display media (according to examples of the present disclosure), these comparisons are made because widespread acceptance of e-paper display media may depend, in part, on a consumer's ability to relate their use of e-paper display media to prior experiences with which they are comfortable, such as their everyday, familiar use of traditional paper. As described above, at least some aspects and/or examples of the passive e-paper display media (as described in the present disclosure) are likely to appeal to numerous aspects by which a consumer feels comfortable with traditional paper.

Moreover, in at least some examples of the present disclosure, an e-paper display media includes features and attributes also not found in traditional paper, foremost of which is re-writability, as well as the environmental responsibility achieved by avoiding putting used traditional paper in the garbage.

These examples, and additional examples, are described and illustrated below in association with at least FIGS. 1A-10.

Figures 1A, 1B:
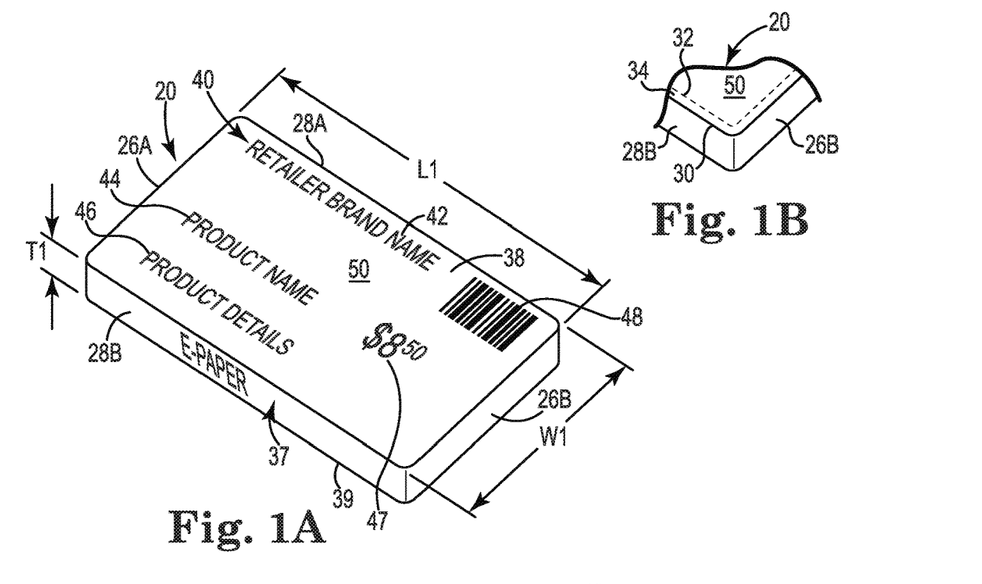
FIG. 1A is a perspective view schematically illustrating a passive e-paper display media, according to an example of the present disclosure.
FIG. 1B is a partial enlarged view of the e-paper display media of FIG. 1A, according to an example of the present disclosure.

FIG. 1A is a perspective view of a display media 20, according to an example of the present disclosure. As shown in FIG. 1A, media 20 includes opposite ends 26A, 26B and opposite side edges 28A, 28B, as well as opposite surfaces 38, 39. Media 20 also includes or is defined by e-paper display 37 with one of surfaces 38, 39 corresponding to an image-writing surface of the e-paper display 37 and one of those respective surfaces 38, 39 corresponding to an image-viewing surface of the e-paper display 37. In some examples, the image-viewable surface (i.e. image-bearing surface) corresponds to the image-writing surface of the e-paper display 37 while in some examples, the image-viewable surface (i.e. image-bearing surface) corresponds to a non-image-writable surface of the e-paper display 37. Further details of these relationships are described later in association with at least FIGS. 3 and 4A.

As further shown in FIG. 1A, in some examples media 20 bears an image 40 expressed across substantially the entire available viewing surface on one face of media 20. In one aspect, image 40 includes portions 42 ("Retailer Brand Name"), 44 ("Product Name"), 46 ("Product Details"), and 48 (Bar Code graphic). Accordingly, image 40 comprises text and/or graphics. It will be understood that in this context, in some examples, graphics also refers to an image, such as specific picture of a person, object, place, etc. Moreover, the particular content of the information in image 40 is not fixed, but is changeable by virtue of the rewritable nature of the e-paper display 37 of media 2. In one example, a location, shape, size of portions 42, 44, 46, 48 of an image 40 is also not fixed, but is changeable by virtue of the rewritable nature of the e-paper display 37 of media 20.

Figure 2A:
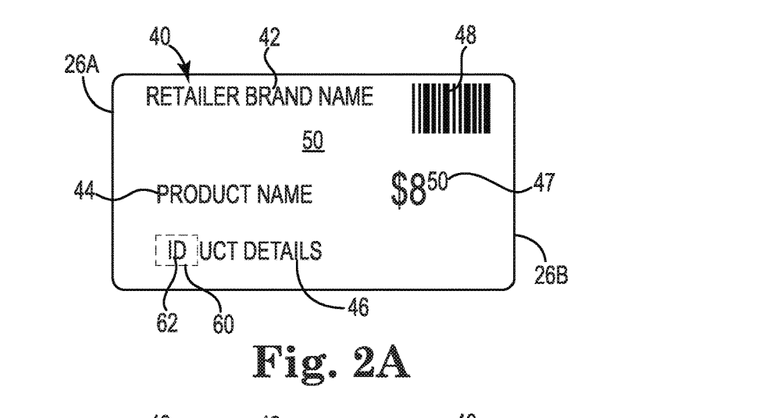
FIGS. 2A and 2B are plan views with each schematically illustrating a passive e-paper display media, according to an example of the present disclosure.
Figure 2B:
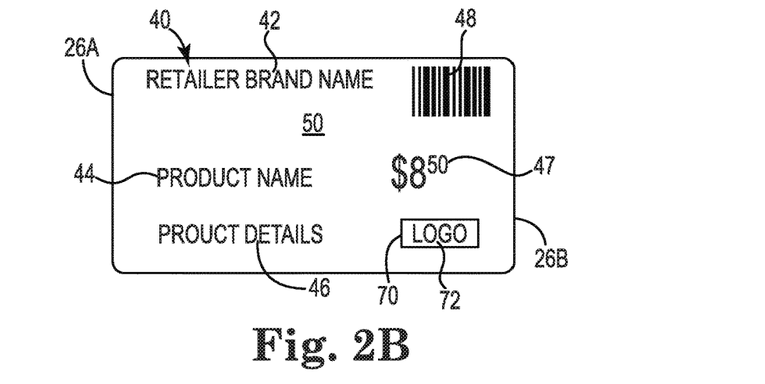

In at least some examples of the present disclosure, in addition to the changeable content available via e-paper display 37, display media 20 includes fixed content appearing one or both surfaces 38, 39 with the fixed content including text and/or graphics, as shown in at least FIGS. 2A-2B.

As shown in the top plan view of FIG. 2A, in some examples viewable surface 38 of media 20 includes information 62 ("ID"), which is printed via invisible ink as represented via dashed box 60. The information 62 is printable in addition to, or instead of the portions of image 40 on viewable surface 38 of display media 20. In one aspect, information 62 is printed in invisible ink (e.g. UV inks) and information 62 does not otherwise obscure the visibly printed information in image 40 (such as the term "Product" in image portion 46) on e-paper display 37. Such invisible information 60 is locatable anywhere on the viewable surface 38 and/or on surface 39 (FIG. 3) of e-paper display 37, can be any size or shape, and is provided in a single location or provided in multiple spaced apart portions.

As shown in the top plan view of FIG. 2B, in some examples viewable surface 38 of display media 20 includes information 72 ("LOGO") which is visibly printed on surface 38, as schematically represented by sold box 70. It will be understood that the solid box does not form part of the visibly printed information 72 and is solely present for illustrative purposes to represent the information 72 is not re-writable, but instead is directly printed onto the same surface 38 at which the re-writable image 40 appears. Moreover, the information 72 is not limited to text, but in some examples, includes graphics.

In some examples, the information 72 is printed via inkjet printheads, digital press, etc. using inks, toners, etc. that would typically be used to print on paper, plastic. Accordingly, such printed information 72 can overlay with, compliment or interfere with the portions of image 40 borne by e-paper display 37. The visibly printed information 72 is locatable anywhere on the surface 38 and/or surface 39 (FIG. 3) of e-paper display 37, and is not limited to any particular size or shape. In contrast, the image(s) 40 (including portions 42, 44, 46, 48) produced via e-paper display 37 are selectively changeable and are not formed by "printing" via deposition of ink. Instead, the e-paper image 40 is formed as a response of charged particles (within the internal structure of the e-paper display) to airborne charges that impact an imaging surface of the e-paper, as further described later in association with at least FIGS. 3 and 4A.

As shown in at least FIGS. 1A-2B, in some examples at least one surface (imaging or non-imaging) of the e-paper display 37 corresponding to a viewing side of the e-paper display 37 remains completely uncovered by other structures, and therefore, is sometimes referred to as being a borderless display media 20. In other words, in some examples, a periphery of at least the viewing surface 38 of the e-paper display 37 is not constrained by a border defined by a structure superimposed onto, overlying, or laterally external to viewing surface 38 of display media 20.

As shown in FIG. 1B, in some examples an outer region 34 of display media 20 is defined between dashed line 32 and an outer edge 30 of surface 38 of display media 20, with outer region 34 extending about an entire periphery of display media 20. In one aspect, the display media 20 is considered borderless in that no other structure (such as a support frame) protrudes upwardly from and/or otherwise defines the boundary of an exposed outer edge 30 of an imageable surface 38 of display media 20. Accordingly, in at least some examples, a borderless e-paper media 20 means that an exposed, imageable surface or area of a media is generally co-extensive with an entire viewing surface 38 on at least one face of a media 20.

In one example, in such an arrangement the entire viewing surface 38 extends in a single plane. In one example, the entire viewing surface 38 is generally flat and thereby defines a generally planar surface to render an appearance similar to traditional media, like paper. In one aspect, such configurations increase the likelihood of consumer acceptance of e-paper display media associated with at least some examples of the present disclosure.

In some examples, substantially the entire viewable surface comprises at least 95% of the available surface on one face of the display media 20. In some examples, substantially the entire viewable surface comprises at least 99% of the available surface on at least one face of the display media 20.

In general terms, display media 20 includes any visual medium of content consumption, such as financial transaction media (e.g. gift cards, prepaid cards, insurance cards, credit cards, etc.) or information transaction media (e.g. shelf tags, boarding passes, shipping labels, package tracking in general). In some examples, additional forms of display media 20 include school material, such as tests, in-class homework, etc. In some examples, display media 20 includes large format flexible rewritable displays, such as engineering drawings, architectural drawings, production specifications, etc.

In at least some examples of the present disclosure, e-paper display 37 of display media 20 is a passive e-paper display. In one aspect, the e-paper display 37 is passive in the sense that it is re-writable and holds an image without being connected to an active power source during the writing process and/or after the writing is completed. Instead, as further described later, the passive e-paper display 37 is imaged in a non-contact manner in which the e-paper display 37 receives charges (emitted by a ion head) that travel through the air and then forms an image 40 via a response by charged particles within a layer of the e-paper display 37. After the imaging process is completed, the passive e-paper display 37 retains the image generally indefinitely and without a power supply until image 40 is selectively changed at a later time.

In at least some examples, the passive e-paper display 37 operates consistent with electrophoretic principles. With this in mind, in at least some examples, passive e-paper display 37 includes a charge-responsive layer in which charged color particles switch color when charges are selectively applied a non-contact manner by an external writing module. In some examples, the charged color particles comprise pigment/dye components. In one aspect, this arrangement is implemented via microcapsules containing a dispersion of pigmented particles in a dielectric oil. In some examples, a resin/polymer forms a matrix material that retains the microcapsules in the charge-responsive layer.

In one example, the passive e-paper display 37 further includes a conductive layer which serves as a counter-electrode on one side of the e-paper display 37. In some examples, an additional functional coating is applied to an imaging side of the e-paper 37.

One implementation of an e-paper display 37 according to above-described examples of the present disclosure is later described and illustrated in association with at least FIG. 3.

In some examples, e-paper display 37 is constructed via placing celled structures between two containing walls. In some examples, e-paper display 37 includes air borne particles insides capsules, such as a "quick response liquid powder display" formerly available from Bridgestone Corporation of Tokyo, Japan.

Figure 3:
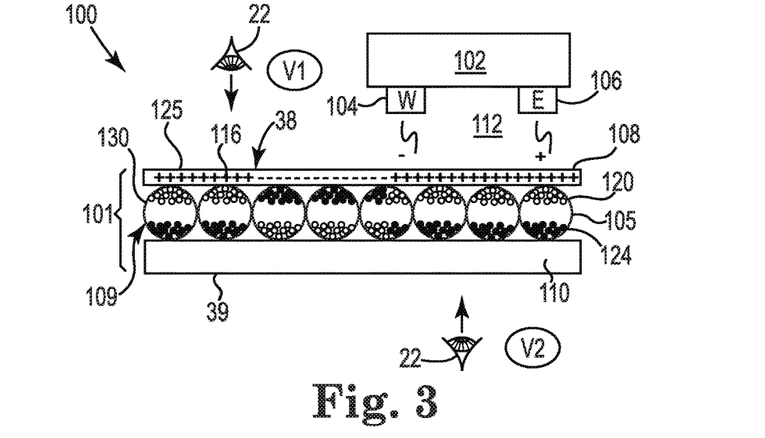
FIG. 3 is a side sectional view schematically illustrating a passive e-paper display media and a writing module, according to an example of the present disclosure.

FIG. 3 is a side sectional view providing a schematic representation of an e-paper display 37 and an associated e-paper writing system 100, according to one example of the present disclosure. In some examples, this e-paper display 37 is implemented via an e-paper structure 101 having at least some of substantially the same features and attributes as e-paper display media previously described in association with at least FIGS. 1A-2B, and in subsequent examples described in association with at least FIGS. 4A-10. Meanwhile, writing system 100 includes a writing module 102 and is provided in FIG. 3 to generally illustrate a response of the e-paper structure 101 (of e-paper display media 37) to an erasing head 106 and/or writing head 104.

As shown in FIG. 3, the writing system 100 includes a writing module 102, writing unit 104, and an erasing unit 106. The writing unit 104 and erasing unit 106 are present on the same side of the writing module 102 that faces a charge receiving surface 108 of the media, with the writing unit 104 suspended above the surface 108. In some examples, one or both of the writing unit 104 and erasing unit 106 comprises an ion-based head. In one example, ion-based head is provided via a corona-based charge ejecting device. In some examples, an ion-based erasing unit 106 is replaced with an electrode that comes into close contact with, or that is dragged along, the surface 108 in front of the writing unit 104. Erasing and writing is performed upon relative movement between the writing module 102 and the media.

In some examples, e-paper structure 101 has an imaging surface 38 and an opposite non-imaging surface 39, as in FIGS. 1A-2B.

In general terms, e-paper structure 101 includes a protective layer 108, a charge-responsive layer 109, and a base 110. The protective layer 108 is sometimes referred to as charge-receiving layer 108. The base 110 defines or includes a counter electrode, as further described below, which serves as a ground plane.

In the example shown in FIG. 3, the charge-responsive layer 109 includes a plurality of microcapsules 105 disposed within a matrix material 130 and with each microcapsule 105 encapsulating some charged black particles 124 and some charged white particles 120 dispersed within a dielectric liquid, such as an oil. In one example, as shown in at least FIGS. 3 and 4A, the black particles 124 are positively charged and the white particles 120 are negatively charged.

The erasing unit 106 erases any information stored via the microcapsules prior to writing information with the writing unit 104. In the example shown in FIG. 3, as the e-paper 101 passes under the writing module 102, the positively charged erasing unit 106 removes negatively charged ions that are attached to the surface 108. The positively charge erasing unit 106 also creates electrostatic forces that drive positively charged black particles 124 away from the charge receiving layer 108 and attract negatively charged white particles 120 toward the charge receiving layer 108. By passing the erasing unit 106 over the charge receiving layer 108, the information written to the e-paper structure 101 is erased by positioning the negatively charged white particles 120 near the top of the microcapsules 105 and pushing the positively charged black particles 124 to the bottom of the microcapsules 105.

Microcapsules 105 exhibit image stability using chemical adhesion between particles and/or between the particles and the microcapsule surface. For example, microcapsules 105 can hold text, graphics, and images indefinitely without using electricity, while allowing the text, graphics, or images to be changed later.

The structure, materials, and dimensions of the various layers and components of e-paper structure 101 are chosen for specific design criteria. In one example, the transparent charge receiving layer 108 is composed of a transparent polymer and can have a thickness between 50 μm and 250 μm. In some examples, the transparent charge receiving layer 108 is also composed of a material that holds charges or is porous or semi-porous to charges and/or ions.

In some examples, the diameter of each microcapsule 105 is substantially constant within charge-responsive layer 109 of e-paper structure 101 and, in some examples, the thickness of charge-responsive layer 109 is between about 20 μm and about 100 μm, such as 50 μm. In some examples, base 110 has a thickness between about 20 μm and about 1 mm, or larger depending on how e-paper display 137 is to be used. In some examples, the protective or charge-receiving layer 108 is about 5 microns thick.

In one aspect, base 110 is structured to provide enough conductivity to enable counter charges to flow during printing. As such, in general terms, base 110 comprises a member including at least some conductive properties. In some examples, base 110 comprises a non-conductive material that is impregnated with conductive additive materials, such as carbon nanofibers or other conductive elements. In some examples, base 110 comprises a conductive polymer, such as a urethane material or a carbonite material. In further examples, base 110 is made from a conductive polymer with carbon nanofibers, to provide flexibility with adequate strength.

In some examples, base 110 is primarily comprised of a conductive material, such as an aluminum material and therefore is impregnated or coated with additional conductive materials.

In some examples, whether conductivity is provided via coating, impregnation or other mechanisms, the body of base 110 is formed from a generally electrically insulative, biaxially-oriented polyethylene terephthalate (BOPET), commonly sold under the trade name MYLAR, to provide flexibility and strength in a relatively thin layer.

At least some examples of different implementations of providing conductivity to base 110 are later described in association with FIGS. 7A-7D.

As noted elsewhere throughout the present disclosure, the base 110 is opaque or is transparent, depending on the particular implementation of the e-paper display media. In some examples, the base 110 comprises a generally resilient material, exhibiting flexibility and in some implementations, semi-rigid behavior. In some examples, the base 110 comprises a rigid material.

In some examples, the protective, charge receiving layer 108 is made from a semi-conductive polymer having a resistivity of about $10^9$ Ohm-cm or a porous layer that enables ion charges to pass through the layer 108 during erasing and/or writing cycles.

FIG. 3 also shows one example writing operation performed by the writing unit 104 in which the deposition of charges influences the distribution of charged pigments/particles within affected microcapsules 105. In one aspect, the writing unit 104 is designed and operated to selectively eject electrons 114, shown as black bars, toward the charge receiving surface 108, when a region of the e-paper structure 101 located beneath the writing unit 104 is to be changed from white to black. As the electrons 114 reach the surface 108, the negatively charged white particles 120 are repelled and driven away from the charge receiving surface 108, while the positively charged black particles 124 are attracted to the negatively charged electrons/ions 114 and driven toward the charge receiving surface 108. Areas of charge-receiving layer 108 will retain a positive charge, and therefore a white appearance in this example. Furthermore, as the writing unit 104 passes over microcapsules 105 while ejecting electrons, the negatively charged white particles 120 are repelled away from the insulating layer and the positively charged black particles 124 are driven toward the charge receiving layer 108.

During writing, electrical contact is made by a ground resource with exposed portions of base 110 to allow biasing of the writing unit 104 while it applies charges to charge receiving layer 108 during the writing process.

The e-paper writing system 100, as shown in FIG. 3, is not limited to implementations in which the writing unit 104 discharges electrons and the erasing unit 106 erases information with positive charges. Instead, in some examples, the microcapsules 105 in matrix material 130 of the charge-responsive layer 109 of e-paper structure 101 are composed of negatively charged black particles 124 and positively charged white particles 120. In such examples, the writing unit 104 is designed to produce positively charged ions, which are absorbed by the surface 108 while the erasing unit 106 uses negative charges to erase information stored in the charge-responsive layer 109 of the e-paper structure 101.

In some examples, charge receiving layer 108 comprises a protective element or coating, which protects the charge-responsive layer 109 (including microcapsules 105) from mechanical damage, pressure and impact, and from collecting tribo charges. It also is designed to reduce increases in dot size due to field screening during charging (the "blooming effect"). In one implementation, the protective charge-receiving layer 108 includes semiconducting characteristics which allow for a controlled decay of the latent charge image, such that the layer 108 gradually dissipates the charges to the ground defined by base 110. The resistivity of the layer 108 is designed to enable fast movement of charges through layer 108. According to one example, the resistivity of the semiconducting charge receiving layer 108 is selected such that the discharge time constant is less than the few seconds after writing but before the media is ejected from the device and returned to the media holder. The charges will typically be transferred to the ground at least partially defined by base 110 through the layer 109. In particular, the matrix material 130 of charge-responsive layer 109 is selected to provide the desired optical and mechanical characteristics, as well as the desired electrical resistivity.

As discussed above, deposition of charges onto the charge receiving layer 125 influences the distribution of charged pigments in the microcapsules 105. Specifically, positive charges on the charge receiving layer 125 attract negatively charge pigments in the microcapsules 105. In this example, the white pigments have a negative charge and the black pigments have a positive charge. Where negative charges have been deposited on the charge receiving layer 125, the black pigments are attracted to the surface. When viewed through the charge receiving layer 125, the negatively charged areas of the charge receiving layer 125 appear black and the positively charged areas appear white.

In one aspect, the semiconducting charge receiving layer 125 is also designed to provide mechanical protection to the underlying layers while being hard enough to resist puncture from pointed objects.

With further reference to FIG. 3, in some examples, base 110 is opaque, such that image-writing surface 38 of e-paper display 37 also serves as an image-viewing surface, as represented via eye icon 22 and reference V1 in FIG. 3. However, in some examples, base 110 is provided as a transparent element, such that the bottom surface 39 of e-paper display 137 serves as an image-viewing surface of the e-paper display 137 as represented via eye icon 22 and reference V2 in FIG. 3. In some examples, in this latter arrangement, layer 125 is opaque.

Figure 4A:
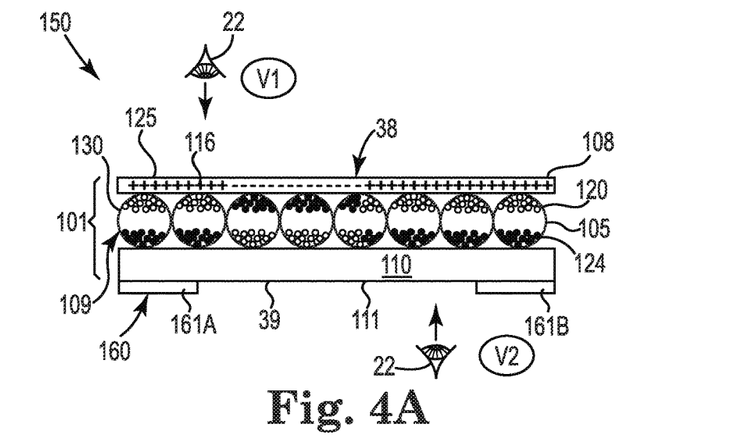
FIG. 4A is a side sectional view schematically illustrating a passive e-paper display, according to an example of the present disclosure.
Figure 4B:
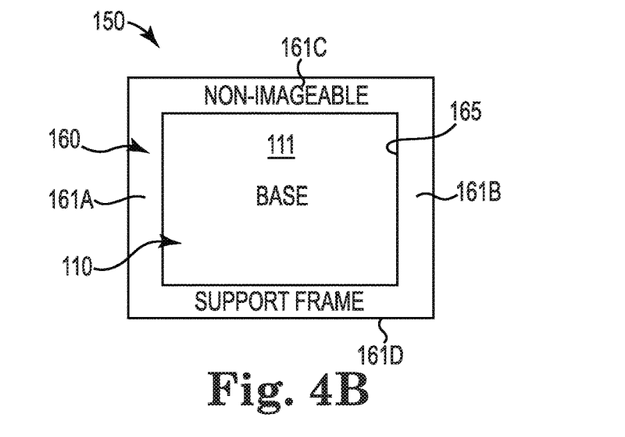
FIG. 4B is a bottom plan view schematically illustrating the e-paper display media of FIG. 4A, according to an example of the present disclosure.

FIG. 4A is a side sectional view schematically illustrating a passive e-paper display media 150, according to one example of the present disclosure, while FIG. 4B is a bottom plan view of e-paper display media 150. In one example, the e-paper display 150 includes at least some of substantially the same features and attributes as the components and structures of the e-paper displays previously described in association with at least FIGS. 1-3, except further including a support frame 160. As shown in FIGS. 4A-4B, the support frame 160 is secured to an exposed surface 111 of base 110, which also defines surface 39 of e-paper structure 101 (of e-paper display 37). In some examples, frame 160 is made from a polycarbonate or polyvinylchloride (PVC) material. However, in more general terms, frame 160 is made from a resilient or semi-rigid material that is generally non-conductive and that provides mechanical strength and toughness to the e-paper structure 101 for protection from bending, compression, abrasion, etc.

In some examples, the frame 160 defines a generally rectangular member, as shown in FIGS. 4A-4B, which generally matches the size and shape of the periphery of the e-paper structure 101 of e-paper display media 150. As shown in FIG. 4B, frame 160 includes opposite portions 161A, 161B and opposite portions 161C, 161D. Stated differently, in this example the frame 160 is generally co-extensive with outer portion of the e-paper structure 101 and defines a border 165 for an exposed portion 111 of the base 110, such that at least one surface 39 of e-paper display 37 is not "borderless." However, while not shown in FIGS. 4A-4B, in some examples the frame 160 completely covers the surface 111 of base 110.

As further shown in FIG. 4A, in some examples the base 110 is opaque, such that the imaging surface 38 also defines a viewing side of e-paper display media 160, as represented via eye icon 22 and reference V1.

However, in some examples the base 110 is at least translucent or transparent, such that non-imaging surface 39 defines the viewing side of e-paper display media 160, as represented via eye icon 22 and reference V2 shown in FIG. 4A. While the frame 160 obscures part of the base 110, the imaging surface 38 of the e-paper structure 101 remains completely uncovered by other structures, and therefore, in one sense at least the image-writing surface 38 of the e-paper display media 150 is borderless. In other words, image-writing surface 38 of the e-paper display media 150 is not constrained by a border defined by a superimposed or overlying structure.

Figure 5:
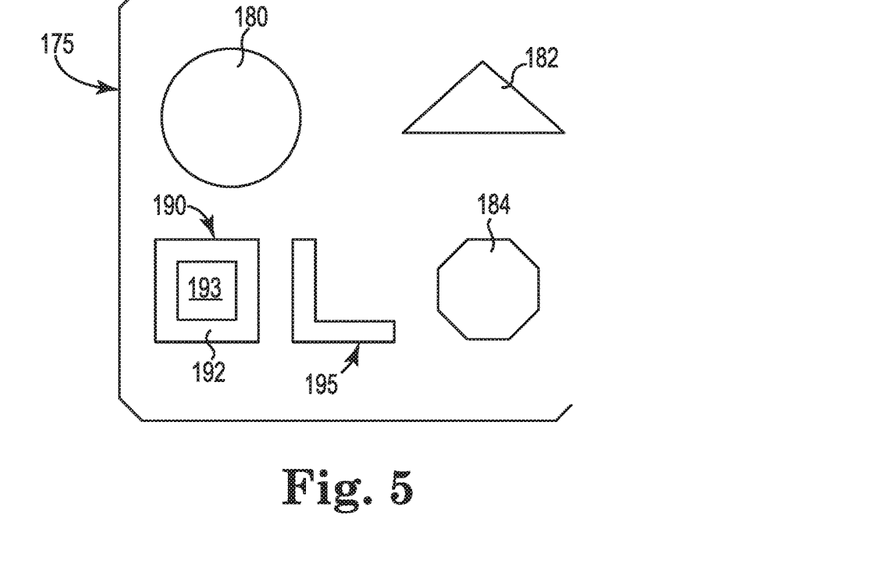
FIG. 5 is a diagram schematically illustrating a gallery of shapes for an e-paper display media, according to one example of the present disclosure.

FIG. 5 is diagram 175 including plan views schematically representing shapes in which a borderless, passive e-paper display can be embodied, according to an example of the present disclosure. As shown in FIG. 5, in some examples, an e-paper display (like the e-paper displays previously described in association with at least FIGS. 1-4B) is embodied in a generally circular shape 180, a generally triangular shape 182, or a polygonal shape 184 (e.g. pentagon, hexagon, etc.). In some examples, an e-paper display 37, 137 retains its borderless characteristics but is embodied in a non-homogenous shape. In some examples, as shown in FIG. 5, a borderless e-paper display 37 is embodied in an L-shaped configuration 195 or in a frame-shaped display 190 having a generally rectangular element 192 defining a generally rectangular shaped aperture 193. It will be understood that similar example configurations would include a generally arcuate-shaped display having a generally annular shape defining a generally circular shaped aperture.

Figure 6:
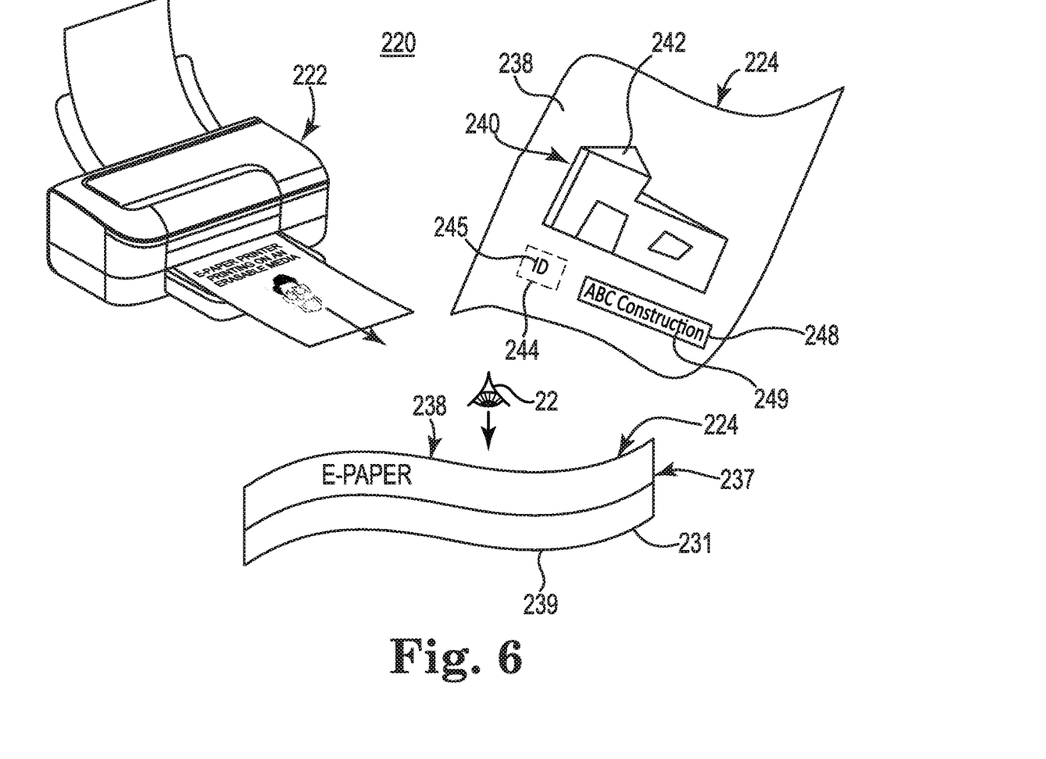
FIG. 6 is a diagram schematically illustrating an e-paper display media according to a gallery of conductive structures, according to an example of the present disclosure.

FIG. 6 is a diagram 220 including a perspective view of an imaging device 222 as well as a side view and perspective view of an e-paper display media 224 in a flexible sheet format, according to one example of the present disclosure. In one example, e-paper display media 224 is consistent with, or includes at least some of substantially the same features and attributes as the e-paper displays, as previously described in association with FIGS. 1-5.

As shown in the side view portion of FIG. 6, e-paper display media 224 includes an e-paper structure having at least some of substantially the same features and attributes as the e-paper structure 101 shown in FIG. 3, with a base 230 (like base 110) comprising a flexible sheet having at least a conductive surface 231 for establishing a ground access/connection. In some examples, the base 230 is opaque. As shown in FIG. 6, the e-paper display sheet 224 is sufficiently flexible that the sheet 224 is capable of being manipulated into undulating shapes while still retaining the image displayed via the internal e-paper structures.

As further shown in FIG. 6, e-paper display sheet 224 bears an image 240 on viewable surface 238. In some examples, e-paper display sheet 224 further includes information 245 printed in invisible form (represented via dashed box 244) on surface 238 and/or information 249 printed in visible form (represented via solid box 248).

In some examples, the imaging device 222 embodies at least one writing module such as writing module 102, as previously described in association with FIG. 3. Upon feeding e-paper display sheet 224 into and through imaging device 222, an imaging surface of e-paper display media 224 (which is the same as the viewable surface in this example) re-writable via erasing and/or writing actions of a writing module of the imaging device 222.

FIGS. 7A-7D are a series of side sectional views schematically illustrating different implementations for providing conductivity of a base portion for an e-paper display media, according to examples of the present disclosure, such as the example e-paper display media described in association with at least FIGS. 1A-6 and 8-10.

Figure 7A:
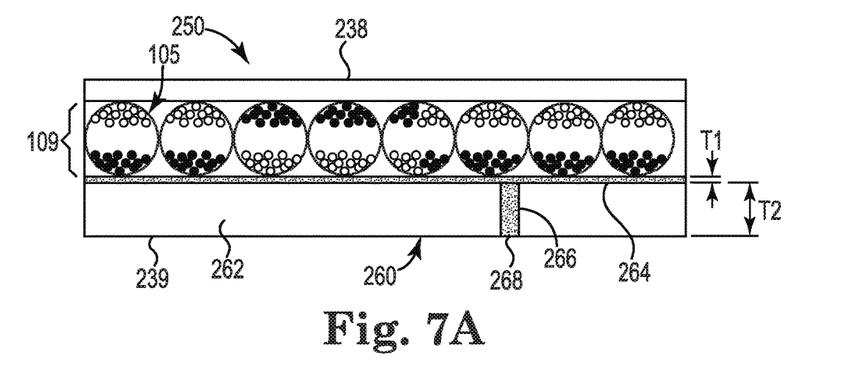
FIG. 7A is a side sectional view schematically illustrating a passive e-paper display with a ground configuration, according to an example of the present disclosure.

FIG. 7A is a side sectional view schematically representing an e-paper display media 250, according to an example of the present disclosure. It will be understood that at least some portions of media 250, such as non-conductive base portion 262, are not shown via cross-hatching to enhance illustrative clarity. In one example, e-paper display media 250 is consistent with, or includes at least some of substantially the same features and attributes, as the e-paper displays previously described in association with at least FIGS. 1-6, except with e-paper display media 250 including a modified base 260. In this arrangement, as shown in FIG. 7A, a modified base 260 includes a non-conductive portion 262 and a conductive portion 264 interposed between the non-conductive base portion 262 and the charge-responsive layer 109 (including microcapsules 105). In one aspect, non-conductive portion 264 acts as a counter electrode or ground plane. As further shown in FIG. 7A, conductive element 266 is in electrical connection with, and extends outwardly in a generally perpendicular orientation from counter electrode 264 with conductive element 266 extending transversely through an interior location within non-conductive portion 262. An outer end portion 268 of conductive element 266 is exposed at an outer surface 239 of non-conductive portion 262.

In this arrangement, the outer end portion 268 serves as a contact pad to establish releasable contact with a "ground" resource associated with an image writing system. As previously noted in association with at least FIG. 3, such ground contact pads provide a biasing function during imaging performed via an erasing head and writing head of a writing module.

Figure 7B:
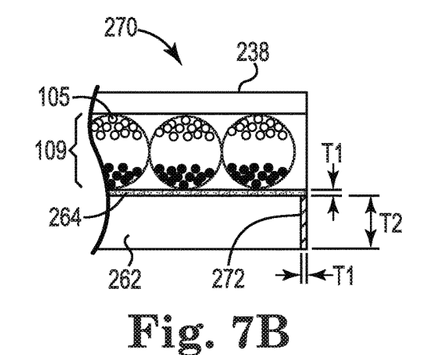
FIG. 7B is a partial side sectional view schematically illustrating a passive e-paper display with a ground configuration, according to one example of the present disclosure.

In one example, conductive layer 264 comprises a relatively thin coating applied to a surface of the non-conductive portion 262. In one implementation, the coating is an indium tin oxide (ITO) coating. In one aspect, via such coating, a 5 to 100 Ohm/sq is achievable and provides suitable conductivity for the relatively low current and low speed involving in writing to the passive e-paper structures in at least some examples of the present disclosure. In some examples, conductive layer 264 has a thickness (T1) of about 2-3 nanometers to 10 microns. Meanwhile, as previously noted, in some examples non-conductive portion 262 has a thickness (T2) of between about 20 microns and about 100 microns. However, in some examples, non-conducive portion 262 has a thickness larger than 100 microns, such as but not limited to 200 microns. It will be understood that at least FIGS. 7A-7B are not necessarily to scale and include schematic representations to provide illustrative clarity regarding structural and functional relationships. In some examples, the conductive element 266 forms a vertical post having a diameter of about 30 to about 100 microns, and with a length extending through non-conductive portion 262 that is commensurate with a thickness of the non-conductive portion 262. In some examples, conductive element 266 has a diameter larger than 100 microns, such as but not limited to 500 microns.

FIG. 7B is partial side sectional view of an e-paper display media 270, according to an example of the present disclosure. E-paper display media 270 has at least substantially the same features and attributes as display media 250 (FIG. 7A) except having a conductive element 272 located at an end of non-conductive portion 262 instead of having an interior-located conductive element 266 as in display media 250 (FIG. 7A).

As shown in FIG. 7B, in one example, the end conductive element 272 is formed via a coating such as the same conductive coating forming conductive layer 264. Accordingly, conductive element 272 has generally the same thickness (T1) as layer 264 and has a length generally matching a thickness (T2) of non-conductive portion 262. In one aspect, the conductive element 272 enables connection to a ground resource at an end of the e-paper display media 270. In another example, conductive element 272 includes attributes (e.g., a greater thickness, and compliance) different than conductive layer 264 to get better electrical contact with an external imaging device.

It will be understood that in some examples, an additional, similar conductive element is located at an end of the non-conductive portion 262 opposite the conductive element 272 shown in FIG. 7B.

Figure 7C:
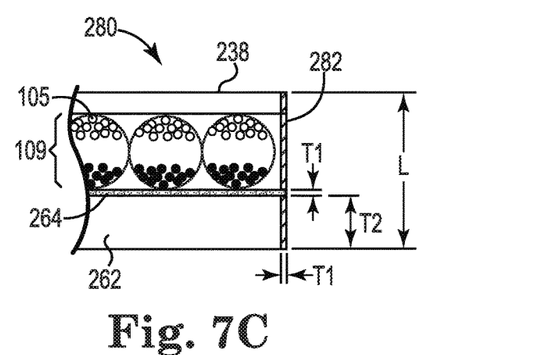
FIG. 7C is a partial side sectional view schematically illustrating a passive e-paper display with a ground configuration, according to one example of the present disclosure.

FIG. 7C is partial side sectional view of an e-paper display media 280, according to an example of the present disclosure. E-paper display media 280 has at least substantially the same features and attributes as display media 270 (FIG. 7B) except with conductive element 282 having a length (L) extending an entire thickness of the e-paper display media 280 (as shown in FIG. 7C) instead of having a length that generally matches the thickness (T2) of non-conductive portion 262, as shown in FIG. 7B.

Figure 7D:
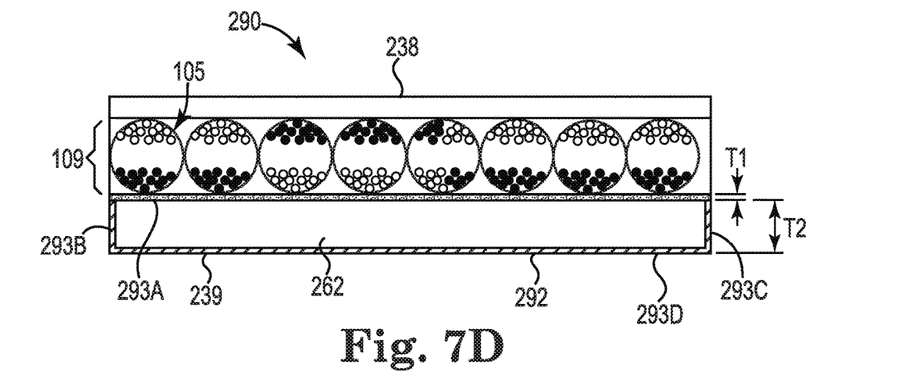
FIG. 7D is a side sectional view schematically illustrating a passive e-paper display with a ground configuration, according to an example of the present disclosure.

FIG. 7D is a side sectional view of an e-paper display media 290, according to an example of the present disclosure. E-paper display media 290 has at least substantially the same features and attributes as display media 250 (FIG. 7B) except with coating-type conductive element 292 generally encapsulating the non-conductive portion 262 instead of just being located at one end, as in FIG. 7B. As such, conductive element 292 includes opposite end portions 293B, 293C and opposite top/bottom portions 293A, 293D. With this arrangement, the top portion 293A provides a ground plane while portions 293B, 293C, 293D provide multiple locations for connection to an external ground resource.

Figure 8:
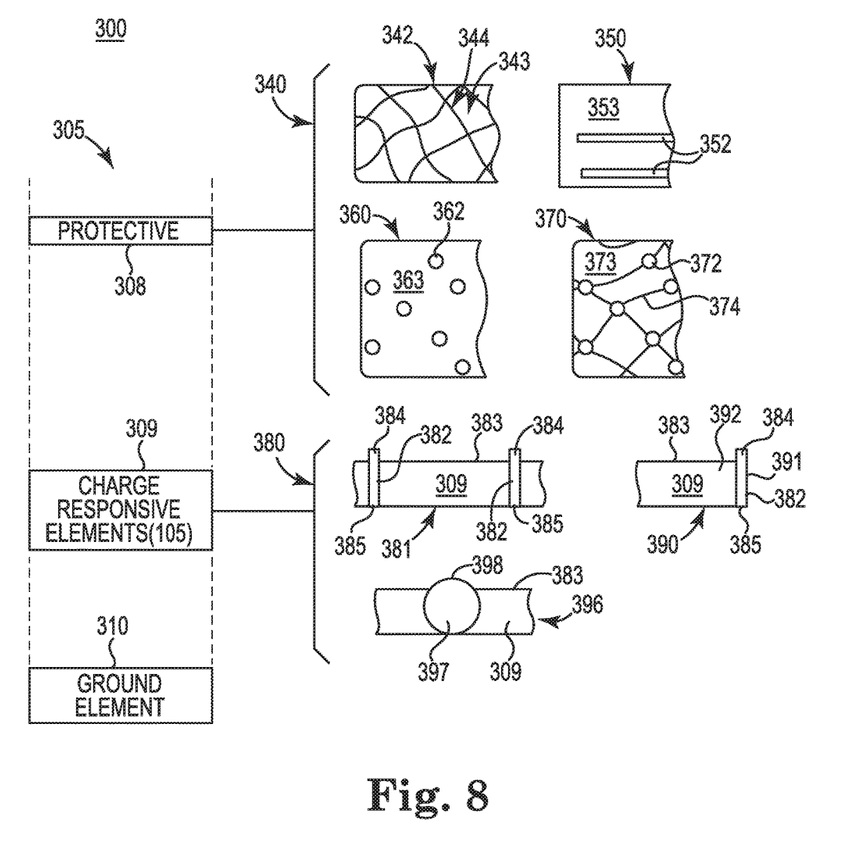
FIG. 8 is perspective view schematically illustrating an imaging device and a passive e-paper display media in flexible sheet form, according to one example of the present disclosure

FIG. 8 is a diagram 300 schematically representing various combinations of components of an e-paper display media 305, according to an example of the present disclosure. In one example, an e-paper display media 305 represented via FIG. 8 is consistent with, or includes at least some of substantially the same features and attributes as, the e-paper displays previously described in association with at least FIGS. 1A-7B.

As shown in FIG. 8, in general terms an e-paper display media 305 includes a ground element 310, a charge-responsive layer 309, and a protective, charge-receiving layer 308 on a side of layer 309 opposite the ground element 310.

In some examples, a borderless e-paper display will include an arrangement in which the imaging surface of the e-paper display media 305 also comprises a viewing surface of the e-paper display media 305.

Moreover, in some examples, the e-paper display 305 is mounted in a manner in which the ground element 310 is not directly accessible via writing such that it becomes more difficult to establish biasing during the ion-based writing process. In this situation, one implementation includes establishing the desired biasing by making a connection to the ground element 310 through the viewing surface (same as the imaging surface in this example) of the e-paper display media 305 in its already mounted position.

Accordingly, in such situations some examples of an e-paper display 305 include forming the protective layer 308 to include some surface-accessible conductive portions and forming the charge-responsive layer 309 to include some conductive portions, with the conductive portions of the charge-responsive layer 309 being in electrical communication with the surface-accessible conductive portions of the protective layer 308 and with the ground element 310. This arrangement establishes a ground path access to be employed during imaging the e-paper display media 305 when direct access to the ground element 310 is otherwise unavailable.

In some examples, the conductive portions of the protective layer 309 can take a variety of forms. As shown in FIG. 8, in some examples, a gallery 340 includes different surface-accessible conductive configurations 342, 350, 360, 370. In one example, configuration 342 includes a network of conductive strands 344 dispersed across imaging surface 343. In one aspect, the strands 344 are generally spaced apart from each other, but connected to each other as they cross over each other. In one example, configuration 350 includes conductive strips 352 spaced apart from each other and extending across an imaging surface 353. In one example, configuration 360 includes a plurality of pads 362 spaced apart from each other and spread over imaging surface 363. In one example, configuration 370 includes a combination of the pads 362 and the strands 344 spread over surface 373.

In some examples, these conductive structures are embedded within the top surface portion of protective layer 308, are printed on protective layer 308 as a conductive ink, and/or provided as carbon fibers formed in a manner complementary with the top surface of protective layer 308. In some examples, the conductive structures are transparent or at least translucent.

It will be understood that the components of the different configurations 342, 350, 360, 370 are combinable in various arrangements, and that protective layer 308 is not limited to the particular pattern of contact pads or strands shown in FIG. 8.

Via such configurations, the conductive structures in and/or on the protective layer 308 connect to conductive structures extending through the charge-responsive layer 309 for connection to the ground plane element 310.

Accordingly, in at least some examples of the present disclosure, FIG. 8 further illustrates a gallery 380 of configurations 381, 390, 396 of conductive structures that extend vertically through the charge-responsive layer 309.

Accordingly, as shown in FIG. 8, configuration 380 includes conductive posts 382 extending vertically through charge-responsive layer 309. In one aspect, this vertical orientation equates to a length or longitudinal axis of posts 382 extending in an orientation generally transverse to a plane (P) through which the charge-responsive layer 381 generally extends. A first end portion 384 of the conductive posts 382 protrude relative to a first surface 383 of the charge-responsive layer 309 and a second end portion 385 of the conductive posts 382 is at least exposed at (or protrudes from) an opposite second surface of the charge-responsive layer 309. The first end portion 384 is sized to extend through the protective layer 308 and be exposed at a contactable surface. In some examples, the first end portions 384 appear as pads (e.g. contact pads 362) as in configuration 342 or are connected to strands 344 as in configuration 370. Meanwhile, each second end portion 385 of the conductive posts 382 connects to ground element 310.

In one example, when the first end portion 384 of each conductive post 382 is exposed at a surface 383 of protective layer 308, the first end portion 384 effectively defines a contact pad 362 (as in configuration 360) such that no further conductive structures need be formed in or on protective layer 308 beyond the first end portions 384 of posts 382.

With this arrangement, a ground path access is established through at least: (1) the contact pads 362 which act as releasably contactable structures on an imaging surface of e-paper display; and (2) the remainder of each conductive post 382 extending through the charge-responsive layer 309 to the ground plane element 310.

As further shown in FIG. 8, gallery 380 includes additional configurations 390, 396. Configuration 390 is similar to configuration 381, except the conductive posts 382 are positioned at an outer side surface or outer end surface 391 of charge-responsive layer 309, such that the conductive posts 382 do not protrude through the interior portions 392 of the charge-responsive layer 309. In one example, this configuration is employed for connection to the network of conductive structures 344 in configuration 342 for protective layer 308.

On the other hand, configuration 396 of conductive structures 397 does extend or protrude through an interior portion 392 of the charge-responsive layer 309. In this example, the conductive structures 397 take the form of spheres with each conductive sphere having a diameter larger than a diameter of the adjacent microcapsules 105 such that a portion 398 of the conductive spheres 397 protrude relative to the surface 383 of charge-responsive layer for extension through protective layer 308 in a manner similar to that described for conductive posts 382. In one example, the exposed portion 398 of each conductive sphere 397 corresponds to a structure similar to a contact pad (such as contact pads 362 shown in configuration 360), and as such, no further conductive structures need be formed in or on protective layer 308.

In at least some examples, the quantity and/or spacing of conductive structures in the protective layer 308 and the charge-responsive layer 309 is sufficient to maintain a generally continuous connection of a ground tool (associated with a writing module) relative to the ground element 310.

One implementation of the e-paper display examples associated with at least FIG. 8 corresponds to a shelf tag label, in which the shelf tag label has already been mounted on an exposed end or edge of an inventory shelf or a merchandising shelf, such that the ground element 310 is generally inaccessible from the front/viewing orientation at which a writing module typically would be positionable at the front edge/end of the shelf.

Figure 9:
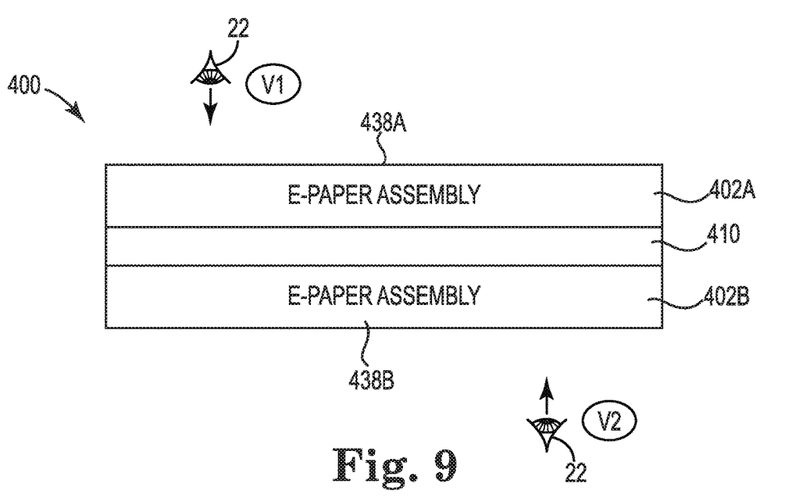
FIG. 9 is a side plan view schematically illustrating a display media including a pair of e-paper displays in a duplex format, according to one example of the present disclosure.

FIG. 9 is a side sectional view schematically representing a passive e-paper display media 400, according to one example of the present disclosure.

As shown in FIG. 9, e-paper display media 400 includes two e-paper display assemblies 402A, 402B located on opposite sides of a common element 410. In one example, each e-paper display assembly 402A, 402B is consistent with, or includes at least some of substantially the same features and attributes as, the e-paper display medias previously described in association with at least FIGS. 1-8. As such, each e-paper assembly 402A, 402B provides a viewable and imageable surface 438A, 438B of a passive e-paper display, respectively.

Accordingly, in some examples, each e-paper display assembly 402A, 402B includes its own protective layer, like protective layer 108, 308. In some examples, each e-paper assembly 402A, 402B includes its own base 110, 310 that includes or defines a counter electrode element (e.g. ground).

However, in some examples, each e-paper assembly 402A, 402B omits its own base (like base 110) and instead, the two e-paper assemblies 402A, 402B share element 410 as a common base, with element 410 providing generally the same features and attributes as base 110. In some examples, it will be understood that element 410 has a length sufficient such that the opposite ends of element 410 are exposed to be contacted to establish a ground path during imaging the e-paper assemblies 402A, 402B.

However, it will be understood that e-paper assemblies 402A, 402B can be implemented via other types of passive e-paper structures that enable erasing and writing on opposite faces of a single body.

Figure 10:
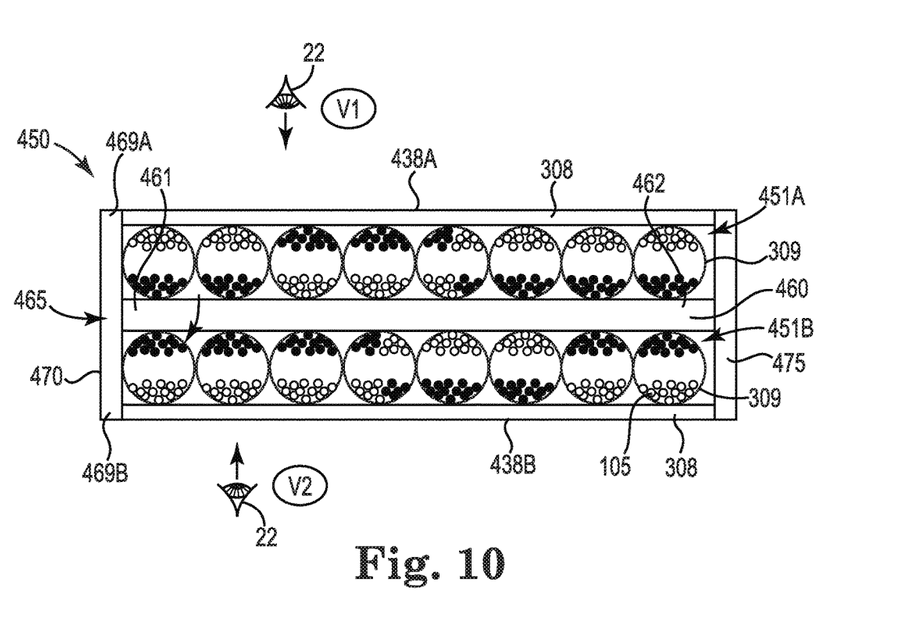
FIG. 10 is a side sectional view schematically illustrating a display media including a pair of e-paper displays in a duplex format, according to one example of the present disclosure.

FIG. 10 is a side sectional view of an e-paper display media 450, according to an example of the present disclosure. In one example, e-paper display device 450 is consistent with, or includes at least some of substantially the same features and attributes as, display media 400. In one implementation, the e-paper assemblies 402A, 402B (FIG. 9) are provided via e-paper structures 451A, 451B (FIG. 10), which comprise at least some of the same features and attributes as the e-paper display medias, as previously described in association with at least FIG. 3. In one implementation, each e-paper assembly 451A, 451B provides a viewable and imageable surface 438A, 438B of a passive e-paper display, respectively.

As shown in FIG. 8, each e-paper assembly 451A, 451B includes a charge-responsive layer 309 and a protective, charge-receiving layer 308. However, each e-paper assembly 451A, 451B does not include its own counter electrode (i.e. ground plane). Instead, e-paper display media 450 includes a first common element 460 sandwiched between the two respective e-paper structures 451A, 451B and which is made from an at least partially conductive material to serve as the ground plane for both e-paper structures 451A, 451B. In some examples, the first common element 460 is implemented via a structure at least consistent with the grounding configurations (i.e. counter electrode configurations) previously described in association with at least FIG. 3 and FIGS. 7A-7D. Accordingly, in some examples, first common element 460 will have a thickness that is substantially less than a thickness of the adjacent e-paper structures despite the relatively large appearance of first common element 410, 460 in FIGS. 9-10. In addition to those examples, in other examples first common element 460 comprises a relatively thin layer of conductive epoxy that provides a conductive ground plane function while having desired adhesive and/or binding properties.

In one aspect, the first common element 460 interposed between the respective charge-responsive layers 309 of the e-paper structures 451A, 451B such that the respective protective layers 308 face outwardly in a direction away from each other and away from first common element 460.

In addition, as further shown in FIG. 10, the e-paper display media 450 includes a second common element 465 electrically and mechanically connected to an end of the first common element 460, and with the second common element 465 extending generally perpendicular to the first common element 460. The second common element 465 has a length to cause each opposite end 469A, 469B to be exposed at or near the imaging surface 438A, 438B of each respective e-paper assembly 451A, 451B. Moreover, an outer surface 470 of second common element 465 is exposed to the ambient environment, thereby making outer surface 470 available for connection to, or releasable contact with, an external ground element to facilitate biasing of the during application of charges to e-paper assemblies 451A, 451B. In some examples, the second common element 465 and first common element 460 are implemented consistent with at least the example conductive element (264, 282) configuration of FIG. 7C.

In some examples, second common element 465 has a length greater than or equal to an overall thickness of e-paper assemblies 451A, 451B (and the first common element 460) such that the ends 469A, 469B provide a primary conductive contact surface to establish a ground path for the e-paper assemblies during imaging. In some examples, second common element 465 has a length less than an overall thickness of e-paper assemblies 451A, 451B (and the first common element 460) such that the outer surface 470 of second common element 465 provides the primary conductive contact surface to establish a ground path for the e-paper assemblies during imaging.

In some examples, second common element 465 has a thickness of about 2-3 microns.

However, while not shown in FIG. 10, in some examples, each e-paper structure 451A, 451B includes its own ground plane (i.e. counter electrode element) of the type shown in FIG. 3. In this arrangement, first common element 460 acts as a mechanical support and/or common ground element.

In some examples, the e-paper display media 450 includes a structural support 475 mounted to an opposite end 462 of first common element 460 and with its longitudinal axis extending generally perpendicular to the first common element 460 to generally bolster the mechanical strength of the e-paper assemblies 451A, 451B while protecting them from normal wear and tear during handling.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A media comprising:
   a re-writable, passive e-paper display including a first side and an opposite, second side, wherein the first side of the e-paper display includes an image-viewable surface that is borderless,
   wherein a respective one of the first and second sides defines a conductive portion and the other respective one of the first and second sides defines a charge-receiving portion,
   wherein the conductive portion comprises a first and second conductive element and a non-conductive element,
   wherein the second conductive element has a first end and an opposite second end, with the first end in electrical connection with the first conductive element, extending through an interior of a non-conductive element and generally transversely to the first conductive element to expose the second end at an outer surface of the non-conductive element,
   wherein the e-paper display is imageable upon receipt of airborne charges on a respective one of the first and second sides having the charge-receiving portion and, wherein the charge-receiving portion corresponds to the image-viewable surface, and
   wherein at least one of the charge-receiving portion and the conductive portion is transparent.

2. The display media of claim 1, wherein the e-paper display includes a charge-responsive color particle layer sandwiched between the charge-receiving portion and the conductive portion.

3. The display media of claim 2, wherein the first conductive element is sandwiched between the non-conductive element and the charge-responsive color particle layer.

4. The display media of claim 3, wherein the conductive portion is transparent and is formed from a conductive polymer.

5. A transaction media comprising:
   a rewritable, passive e-paper display having a first side and an opposite, second side, wherein the display includes an image-bearing surface generally co-extensive with substantially the entire first side,
   wherein one of the first and second sides defines a conductive portion,
   wherein the conductive portion comprises a first and second conductive element and a non-conductive element,
   wherein the second conductive element is in electrical connection with the first conductive element and located at one end of the non-conductive element to extend generally transversely to the first conductive element to form a ground return path to the non-conductive element, and
   wherein the image-bearing surface is changeable upon receipt of airborne charges on one of the respective first and second sides that is opposite to the conductive portion.

6. The transaction media of claim 5, comprising:
   a permanent image printed onto a first portion of the image-viewable surface, wherein the permanent image is separate from and independent of an image visible at the image bearing surface.

7. The transaction media of claim 6, wherein at least a portion of the permanent image comprises at least one of:
   a visible portion including at least one of text, a bar code, and graphics; and
   an invisible ink portion.

8. The transaction media of claim 7, wherein the e-paper display comprises at least one of a financial transaction card, an information transaction card, and a shelf tag label.

9. The transaction media of claim 5, wherein the e-paper display includes a charge-responsive particle portion sandwiched between a charge-receiving portion and the conductive portion, wherein a respective one of a protective portion and the conductive portion corresponds to the first side and the other respective one of the protective and conductive portions corresponds to the second side, and
   wherein the respective side of the e-paper display including the conductive portion comprises at least one generally rigid support structure.

10. A display device comprising:
    a first passive e-paper display defining a first side;
    a second passive e-paper display defining an opposite second side; and
    a first at least partially conductive common element,
    wherein the first common element is sandwiched between the respective first and second displays, and wherein at least one of the first and second e-paper displays is generally coextensive with an entirety of a respective one of the first and second sides, wherein each e-paper display bears an image that is modifiable via receipt of airborne charges from an external writing module.

11. The display device of claim 10, wherein each e-paper display comprises a charge-responsive color particle layer and a semi-conductive protective layer, wherein the first common element is interposed between the respective charge-responsive layers of the e-paper displays such that the respective protective layers face outwardly in a direction away from each other, wherein both of the respective protective layers are transparent and define image-bearing sides of the display device.

12. The display device of claim 10, comprising a size and a shape corresponding to a flexible document feedable through an imaging device.

13. The media of claim 1, further comprising:
a second re-writable, passive e-paper display including a first side and an opposite, second side, wherein the first side of the second e-paper display includes an image-viewable surface,
wherein the second side of the second re-writable passive e-paper is attached to the second side of the re-writable passive e-paper.

14. The transaction media of claim 5, further comprising:
a second re-writable, passive e-paper display having a first side and an opposite, second side, wherein the display includes an image-bearing surface on the first side,
wherein the re-writable passive e-paper display and the second re-writable passive e-paper display are part of the same transaction media and wherein the first side of the second re-writable passive e-paper display is opposite the first side of the re-writable e-paper display.

15. The display device of claim 10, wherein the conductive common element comprises a second conductive element having a first end and an opposite second end, with the first end in electrical connection with the conductive common element, extending through an interior of a non-conductive element and generally transversely to the conductive common element to expose the second end at an outer surface of the non-conductive element.

16. The display device of claim 10, wherein the conductive common element comprises a second conductive element in electrical connection with the conductive common element and located at one end of a non-conductive element to extend generally transversely to the conductive common element.

17. The display device of claim 10, wherein the e-paper display comprises at least one of a financial transaction card, an information transaction card, and a shelf tag label.

18. The display device of claim 1, wherein the re-writable passive e-paper display device comprises at least one of a financial transaction card, an information transaction card, and a shelf tag label.

19. The display device of claim 1, wherein the second conductive element provides conductivity to the non-conductive element.

20. The display device of claim 1, wherein the conductive portion is transparent.

* * * * *